Figure 1:
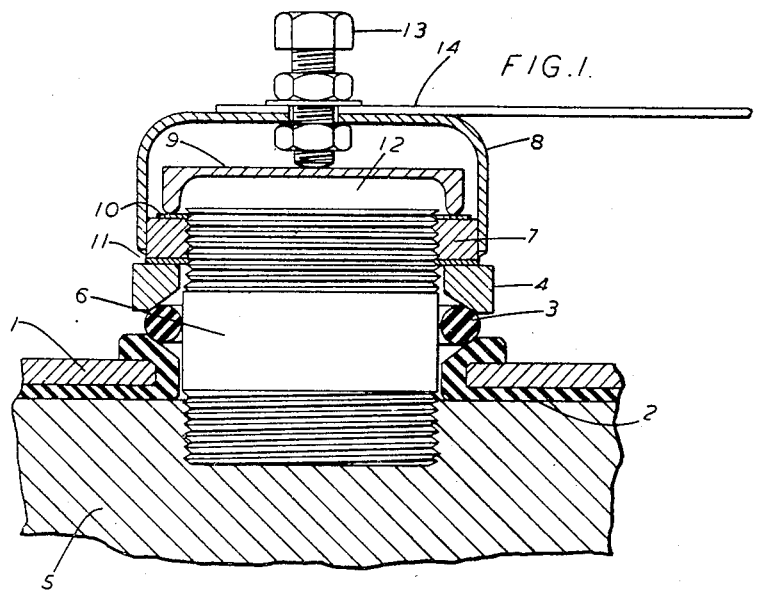

Feb. 20, 1951     A. W. RAVENSCROFT     2,542,056

ELECTRODE SUPPORT FOR ELECTROLYTIC CELLS

Filed Sept. 9, 1946

Inventor
Arthur W. Ravenscroft

By
Cushman, Darby & Cushman
Attorneys

Patented Feb. 20, 1951

2,542,056

UNITED STATES PATENT OFFICE 2,542,056

ELECTRODE SUPPORT FOR ELECTROLYTIC CELLS

Arthur Wesley Ravenscroft, Frodsham, England, assignor to Imperial Chemical Industries Limited, a corporation of Great Britain Application September 9, 1946, Serial No. 695,624
In Great Britain September 17, 1945

2 Claims. (Cl. 204—286)

This invention relates to improvements in electrode supports for electrolytic cells.

In carrying out the electrolysis of an aqueous solution with the production of a gas it is frequently convenient to use a graphite or other carbon electrode either dipping into the electrolyte or suspended in it by a carbon rod which passes through the cover of the cell and which also supplies current to the electrode. In some of such arrangements electrolyte tends to seep up the porous carbon electrode or its support and to be exuded through the top of the rod or electrode outside the apparatus; this is more particularly liable to occur if for any reason the pressure of gas within the cell is maintained above atmospheric.

Such exudation of electrolyte is disadvantageous in as much as it may cause corrosion of electrical contacts supplying current to the electrodes.

We have now found that such exudation or seepage of electrolyte can be largely avoided by providing the end of the carbon electrode support projecting through the casing of the cell with an impervious cap maintaining between itself and the top of the electrode support a body of grease or grease-like material, and providing means for applying pressure to compress the grease-like material against the electrode support.

According to the present invention, therefore, in an electrolytic cell having a carbon electrode in contact with aqueous electrolyte and a carbon support projecting through the cell casing and adapted to carry electric current to said electrode, there is provided means for preventing seepage of electrolyte through said support comprising an impervious cap on the projecting part of the support, a body of grease-like material between said cap and said support, and means for pressing the grease-like material against the surface of the support.

In one form of the invention, in which an anode is supported by a carbon rod passing through the cover of an electrolytic cell, the upper end of the rod is threaded to receive a ring of metal, ebonite, or other suitable material, which carries a stirrup disposed immediately above the end of the rod, and a circular metal cap rests with its rim on the upper surface of the ring screwed on to the rod; if desired a packing ring of cork, rubber, or other compressible material may be interposed between the cap and the metal rim. The stirrup carries a set screw adapted to bear against the top of the cap and to be rendered immovable by locknuts. The space between the cap and the top of the anode is filled with a grease-like composition; this may be, for example a grease-like mixture of a chlorinated naphthalene and a chlorinated paraffin wax, or a viscous chlorinated paraffin wax thickened by an addition of chlorinated rubber; a hydrocarbon grease could also be used.

In use, the set screw in the stirrup is made to press against the top of the cap, thus pressing the grease-like composition into the pores in the surface layers of the rod; as a result, electrolyte seeping up the pores of the rod will meet a barrier of grease-like material, and exudation of the electrolyte is prevented.

The ring and stirrup may be independent of the electrical connections to the rod, or they may, if desired, be part of such connections. Thus the ring and stirrup may be of copper, and the electrical leads to the rod may be clamped to the stirrup by the locknuts for the set screw.

In another form of the invention a blank ended nut of brass or other suitable material is screwed on to the projecting end of the carbon supporting rod, and a suitable grease-like composition is introduced under pressure into the space between the brass nut and the carbon through a grease nipple on the nut. A copper connection for the electric current is bolted to the blank end of the brass nut.

The invention is further illustrated by the accompanying drawings, not to scale, in which like numbers represent like parts.

In Figure 1 there is shown in section part of the cover 1 of an electrolytic cell with the carbon anode 5 held in close contact with the ebonite lining 2 of the cover by the carbon rod 6 which passes through the cover. A rubber ring 3 makes a pressure tight seal between the cover and the rod 6. A metal gland ring 4 is pressed against the rubber ring 3 by a heavy brass nut 7 screwed on to the threaded upper end of 6. A metal stirrup 8 is brazed to opposite sides of the nut 7 and carries the set screw 13 with locknuts which presses on the metal cap 9. The space 12 between 6 and 9 is filled with a sealing paste resistant to chlorine. Joint rings 10 and 11 of rubber or other compressible material are disposed on either side of the nut 7 in contact with 4 and 8 respectively. The copper strip 14 serves to carry the electric current to the electrode support.

Figure 2:
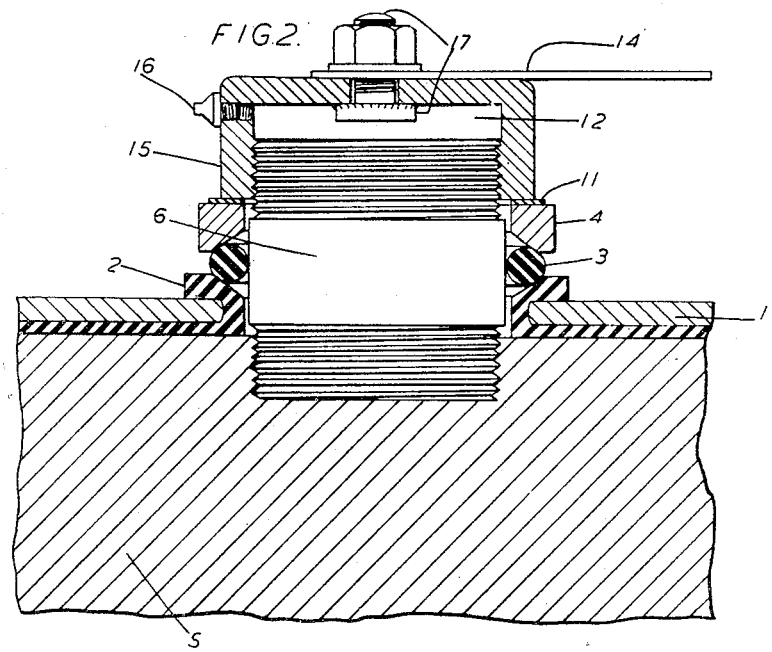

Figure 2 shows another form of electrode support in which the numbers 1 to 6 inclusive have the same signification as in Figure 1. The brass nut 15 is screwed on to the threaded upper end of the carbon rod 6 to form a cap and presses on the joint ring 11 of compressible material. The copper strip connection 14 is fixed to the brass cap 15 by means of the bolt 17 which is brazed to the cap. The cap 15 also carries a grease nipple by means of which a grease-like material, for example a liquid chlorinated paraffin wax thickened by means of chlorinated rubber, is introduced under pressure into the space 12 between the cap 15 and the carbon rod 6.

Carbon electrode supports according to the present invention may be used for example in an electrolytic cell for the electrolysis of brine flowing at relatively high speeds; such an apparatus is described and claimed in copending applications of Carter and Ravenscroft, Serial No. 695,623, filed September 9, 1946, and Hirsh and Carter, Serial No. 696,694, filed September 9, 1946, now Patent Number 2,503,337.

I claim:

1. In an electrolytic cell having a carbon electrode in contact with an aqueous electrolyte and a carbon support having an end projecting through the cell casing adapted to carry electric current to said electrode, means for preventing seepage through the projecting end of said carbon support by pressing grease-like material against the top of the carbon support and into the pores thereof comprising a ring threaded on the projecting end of the carbon support, a stirrup rigidly attached to said ring, a flexible impervious cap held in sealing contact with said ring by a screw element carried by said stirrup and a resilient sealing member between said ring and the cell casing.

2. Seepage preventing means as claimed in claim 1, wherein said resilient sealing member comprises a joint-ring of rubber-like material.

ARTHUR WESLEY RAVENSCROFT.

REFERENCES CITED

The following references are of record in the file of this patent:

UNITED STATES PATENTS

| Number | Name | Date |
|---|---|---|
| 735,464 | Byrnes | Aug. 4, 1903 |
| 1,032,529 | Burgess | July 16, 1912 |
| 1,196,225 | Foos | Aug. 29, 1916 |
| 1,622,550 | Towle | Mar. 29, 1927 |
| 1,779,242 | Laubi | Oct. 21, 1930 |

FOREIGN PATENTS

| Number | Country | Date |
|---|---|---|
| 17,161 | Great Britain | of 1897 |